United States Patent
Latino et al.

(10) Patent No.: US 9,361,087 B1
(45) Date of Patent: Jun. 7, 2016

(54) DEVICE DRIVER AGGREGATION IN OPERATING SYSTEM DEPLOYMENT

(71) Applicant: International Business Machines Corporation, Armonk, NY (US)

(72) Inventors: Francesco Latino, Bari (IT); Gianluca Mariani, Rome (IT); Bernardo Pastorelli, L'Aquila (IT); Antonio Secomandi, Milan (IT)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 14/849,120

(22) Filed: Sep. 9, 2015

Related U.S. Application Data

(63) Continuation of application No. 14/551,887, filed on Nov. 24, 2014.

(51) Int. Cl.
*G06F 13/00* (2006.01)
*G06F 9/445* (2006.01)
*G06F 9/44* (2006.01)

(52) U.S. Cl.
CPC ................ *G06F 8/61* (2013.01); *G06F 9/4411* (2013.01)

(58) Field of Classification Search
CPC .................................................... G06F 9/4411
USPC ......................................................... 719/327
See application file for complete search history.

(56) References Cited

U.S. PATENT DOCUMENTS

| | | | |
|---|---|---|---|
| 6,530,018 B2 | 3/2003 | Fleming, III | |
| 7,720,945 B2 | 5/2010 | Iszlai et al. | |
| 8,117,612 B2 | 2/2012 | Flegg et al. | |
| 8,132,187 B2 | 3/2012 | Kluchevskyy | |
| 8,161,101 B2 | 4/2012 | Bezanson et al. | |
| 8,407,662 B2 | 3/2013 | Lam | |
| 8,732,730 B2 | 5/2014 | Hwang | |
| 9,081,747 B1 | 7/2015 | Tabieros | |
| 2007/0101342 A1 | 5/2007 | Flegg | |
| 2007/0169116 A1 | 7/2007 | Gujarathi et al. | |
| 2011/0320799 A1 | 12/2011 | Lam | |
| 2012/0221842 A1 | 8/2012 | Gopalakrishnan et al. | |
| 2012/0291023 A1 | 11/2012 | Lu et al. | |
| 2014/0089652 A1 | 3/2014 | Cerri et al. | |
| 2015/0172408 A1 | 6/2015 | Sun | |

OTHER PUBLICATIONS

Ciesla, M. (Contributed by), "UCS Driver Installation for Common Operating Systems", CISCO, updated Sep. 6, 2013, <http://www.cisco.com/c/en/us/support/docs/servers-unified-computing/ucs-manager/116349-technote-product-00.htm>.

Gordon, A., "SCCM OS Deployment—How to Create a Driver Package", Jul. 17, 2011, http://www.itsupportguides.com/configmgr-sccm/sccm-os-deployment-how-to-create-a-driver-package/>.

(Continued)

*Primary Examiner* — Andy Ho
(74) *Attorney, Agent, or Firm* — Maeve M. Carpenter

(57) ABSTRACT

A tool for managing device driver aggregation during operating system deployment. The tool receives, by a first computer processor, a request for a device bundle, the request including a unique identifier. The tool determines, by the first computer processor, whether an available driver bundle matches the requested device bundle based, at least in part, on the unique identifier. Responsive to determining an available driver bundle does not match a requested device bundle, the tool creates, by the first computer processor, an associated driver bundle for the requested device bundle.

8 Claims, 4 Drawing Sheets

(56) References Cited

OTHER PUBLICATIONS

"Managing and Deploying Driver Packages", Windows Server, updated Jan. 6, 2009, <http://technet.microsoft.com/en-us/library/dd348456%28WS.10%29.aspx#boot>.

"Operating System Management with Tivoli Provisioning Manager for OS Deployment", Tivoli Provisioning Manager 7.1.1—Provisioning User Guide, downloaded Jul. 9, 2014, <http://pic.dhe.ibm.com/infocenter/tivihelp/v28r1/index.jsp?topic=%2Fcom.ibm.tivoli.tpm.scenario.doc%2Fos%2Fccom_overview.html>.

U.S. Appl. No. 14/551,887, filed Nov. 24, 2014.

List of IBM Patents or Patent Applications Treated as Related (Appendix P), filed herewith.

DEVICE DRIVER AGGREGATION IN OPERATING SYSTEM DEPLOYMENT

BACKGROUND OF THE INVENTION

The present invention relates generally to operating system management, and more particularly to provisioning device drivers during deployment of an operating system.

The handling of device drivers during the deployment of an operating system (OS) is a delicate and critical process. Typically, each system device in the OS is treated as a single and unique entity, despite other devices that are discovered on the system. An agent component, executed on a machine being provisioned with device drivers, provides the capability to discover system devices that are present on a given machine by performing a system device inventory. The result of such discovery is a device list that identifies the devices interconnected to the local bus.

Based on the device list, a server component and the agent component are able to find a proper device driver to be used for each single device in the device list. Device drivers are sent one at a time for each single device in the device list.

SUMMARY

Aspects of an embodiment of the present invention disclose a method, system, and computer program product for managing device driver aggregation during operating system deployment. The method includes receiving, by a first computer processor, a request for a device bundle, the request including a unique identifier. The method includes determining, by the first computer processor, whether an available driver bundle matches the requested device bundle based, at least in part, on the unique identifier. Responsive to determining an available driver bundle does not match a requested device bundle, the method includes creating, by the first computer processor, an associated driver bundle for the requested device bundle.

DETAILED DESCRIPTION

Embodiments of the present invention recognize that a side effect of device determination and installation performed on-the-fly while the operating system is deployed, with drivers preloaded, is a larger computational footprint, as a provisioning program is often shared among several hardware models and driver conflicts can prevent devices from working correctly.

Embodiments of the present invention provide the capability to manage drivers in an aggregated form, with the system being able to adapt itself to the different configuration of the system models being provisioned in a customer environment. Embodiments of the present invention further provide the capability to prepare an optimal bundle of drivers for a specific target model, where finding the optimal driver bundle is done on the client side, whereas preparation of the driver bundles is done on the server side. Embodiments of the present invention further provide the capability to minimize server computation overload thereby reducing a computational footprint during the driver installation phase of operating system deployment.

Implementation of such embodiments may take a variety of forms, and exemplary implementation details are discussed subsequently with reference to the Figures.

Figure 1:
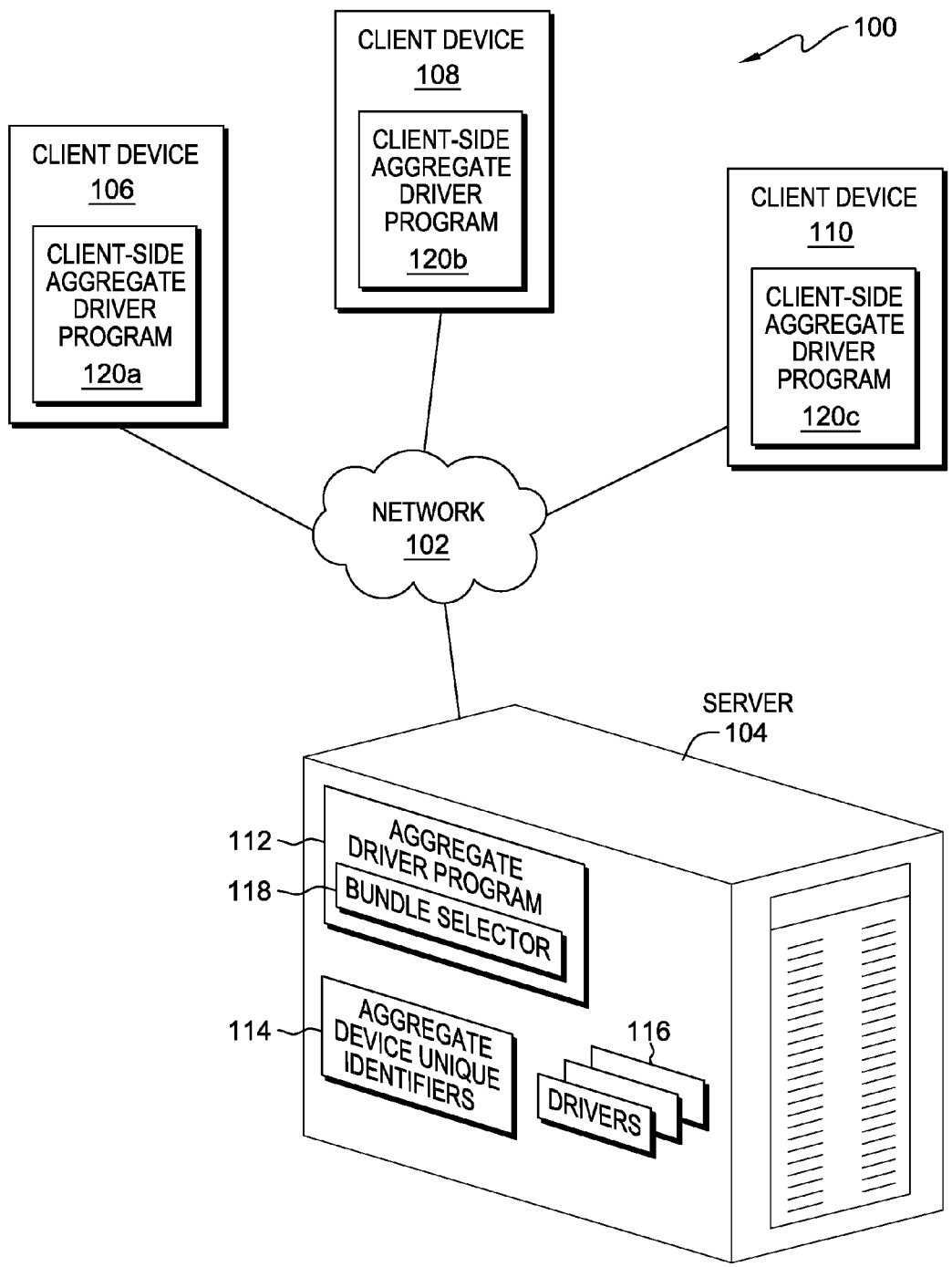
FIG. 1 illustrates a functional block diagram illustrating a data processing environment, generally designated 100, in accordance with an embodiment of the present invention.

The present invention will now be described in detail with reference to the Figures. FIG. 1 is a functional block diagram illustrating a data processing environment, generally designated 100, in accordance with an embodiment of the present invention. FIG. 1 provides only an illustration of one implementation and does not imply any limitations with regard to the environments in which different embodiments may be implemented. Many modifications to the depicted environment may be made by those skilled in the art without departing from the scope of the invention as recited by the claims. Data processing environment 100 includes network 102, server 104, and multiple client devices, such as client device 106, client device 108, and client device 110.

In the exemplary embodiment, network 102 is the Internet representing a worldwide collection of networks and gateways that use TCP/IP protocols to communicate with one another. Network 102 may include wire cables, wireless communication links, fiber optic cables, routers, switches and/or firewalls. Server 104, client device 106, client device 108, and client device 110 are interconnected by network 102. Network 102 can be any combination of connections and protocols capable of supporting communications between server 104, client device 106, client device 108, client device 110, aggregate driver program 112, and client-side aggregate driver program 120(a), 120(b), and 120(c). Network 102 may also be implemented as a number of different types of networks, such as an intranet, a local area network (LAN), a virtual local area network (VLAN), or a wide area network (WAN). FIG. 1 is intended as an example and not as an architectural limitation for the different embodiments.

In the exemplary embodiment, server 104 may be, for example, a server computer system such as a management server, a web server, or any other electronic device or computing system capable of sending and receiving data. In another embodiment, server 104 represents a "cloud" of computers interconnected by one or more networks, where server 104 is a computing system utilizing clustered computers and components to act as a single pool of seamless resources when accessed through network 102. This is a common implementation for data centers in addition to cloud computing applications. In the exemplary embodiment, server 104 includes an aggregate driver program 112, a plurality of aggregate device unique identifiers 114, and a plurality of drivers 116.

In the exemplary embodiment, server 104 includes aggregate driver program 112 for managing device driver aggregation during operating system (OS) deployment. In the exemplary embodiment, aggregate driver program 112 is a software-based component capable of processing target device driver requests originating from one or more client devices, such as client device 106, 108, and 110, during OS deployment, wherein the scope of operating system deployment extends to any program made of machine readable instructions that manage device hardware. In the exemplary embodiment, aggregate driver program 112 includes a bundle selector 118 for determining whether a new device driver bundle must be created, and started to be provisioned at OS deployment, to satisfy a target device driver request, or whether a current device driver bundle already satisfies the target device driver request. In the exemplary embodiment, bundle selector 118 is responsible for creating device driver bundles by abstracting single device drivers into aggregate bundles, based, at least in part, on a plurality of heuristics, such that the device driver bundles contain a best group of available device drivers to satisfy a target device driver request.

In the exemplary embodiment, server 104 includes a plurality of aggregate device unique identifiers (ADUI) 114 for representing a set of peripheral component interconnect (PCI) devices present within one or more client devices, such as client device 106, 108, and 110. In the exemplary embodiment, ADUI 114 is a unique identifier generated as a hashed key of each of the one or more PCI identifiers composing the set of PCI devices, such that each ADUI 114 refers to a unique set of PCI devices present within the one or more client devices. For example, a set of PCI devices present within a client device, such as client device 106, may include a PCI identification (PCI-ID), such as PCI-ID-1, PCI-ID-2, and PCI-ID-3, etc. In this case, ADUI 114 for the set of PCI devices present on client device 106 is defined as a hash key, representing each of the one or more PCI identifiers for the set of PCI devices present within client device 106, such as "A1B2C3".

In the exemplary embodiment, within server 104, each ADUI 114 is associated with a plurality of information including, without limitation, a device driver bundle containing the drivers for all the devices represented by a specific ADUI, an index indicating an amount of requests for the specific ADUI, a status describing effectiveness of the specific ADUI as used by the target client device (i.e., device driver quality feedback), and context information indicating a machine model (i.e., type of client device), and an operating system for which the ADUI references.

In the exemplary embodiment, each ADUI 114 originates within a client device, such as client device 106, 108, and 110. Server 104 receives a target device driver request in the form of a specific ADUI request. In the exemplary embodiment, each ADUI request from the client device is stored in a history log (not shown) with a plurality of information including, without limitation, a specific ADUI 114, a client device where the ADUI request originated, and a time stamp.

In the exemplary embodiment, server 104 includes drivers 116 for provisioning one or more client devices, such as client device 106, 108, and 110 during OS deployment. In the exemplary embodiment, drivers 116 are computer programs that operate or control a particular type of device attached to a computer. Drivers 116 provide a software interface to hardware devices, enabling operating systems and other computer programs to access hardware functions without needing to know precise details of the hardware. In the exemplary embodiment, drivers 116 are aggregated into one or more device driver bundles, based, at least in part, on ADUI requests, for provisioning the one or more client devices during OS deployment.

In the exemplary embodiment, client devices 106, 108, and 110 are clients to server 104 and may be, for example, a desktop computer, a laptop computer, a tablet computer, a personal digital assistant (PDA), a smart phone, a thin client, or any other electronic device or computing system capable of communicating with server 104 through network 102. For example, client devices 106, 108, and 110 may be mobile devices capable of connecting to a network, such as network 102, to request one or more drivers from aggregate driver program 112 on server 104 via a client-side aggregate driver program 120(*a*), 120(*b*), and 120(*c*), respectively.

In an alternate embodiment, client devices 106, 108, and 110 may be any wearable electronic device, including wearable electronic devices affixed to eyeglasses and sunglasses (e.g., Google Glass®), helmets, wristwatches, clothing, wigs, and the like, capable of sending, receiving, and processing data. For example, client devices 106, 108, and 110 may be a wearable electronic device, such as a wristwatch, capable of communicating with a server, such as server 104, to request one or more device drivers during OS deployment.

In the exemplary embodiment, client devices 106, 108, and 110 include a client-side aggregate driver program 120(*a*), 120(*b*), and 120(*c*), respectively, for initiating requests at the client side for device driver bundles during OS deployment. Client-side aggregate driver program 120(*a*), 120(*b*), and 120(*c*) is a client-side software-based component of aggregate driver program 112 on server 104 capable of generating an aggregate device unique identifier (ADUI) for one or more devices present within the client device by hashing a list of inventoried PCI-IDs for each of the one or more devices present within the client device. In the exemplary embodiment, client-side aggregate driver program 120(*a*), 120(*b*), and 120(*c*) sends an ADUI request to aggregate driver program 112, requesting a device driver bundle specific to the ADUI. In the exemplary embodiment, client-side aggregate driver program 120(*a*), 120(*b*), and 120(*c*) generate a specific ADUI 114 for the one or more PCI devices present within client device 106, 108, and 110 respectively. In some embodiments, client-side aggregate driver program 120(*a*), 120(*b*), and 120(*c*) functions as a proxy for aggregate driver program 112 in a peer-to-peer model to provision locally stored device driver bundles to one or more other client devices (not shown). In this embodiment, client-side aggregate driver program 120(*a*), 120(*b*), and 120(*c*) can provide driver provisioning functionality, such as the functionality provided by aggregate driver program 112, to decrease server workload. Client-side aggregate driver program 120(*a*), 120(*b*), and 120(*c*) can monitor ADUI requests broadcast from other client devices (not shown) and fulfill the ADUI requests by providing driver bundles locally available (i.e., driver bundles utilized in current operating system deployment or stored locally after driver installation). For example, client-side aggregate driver program 120(*a*) monitors ADUI requests broadcast by other client devices, such as client device 110, and responsive to determining that a requested driver bundle matches a driver bundle deployed on client device 106, client-side aggregate driver program 112 sends the matching driver bundle to client device 110.

Data processing environment 100 may include additional client devices, servers, networks, displays, and other devices not shown.

Figure 2:
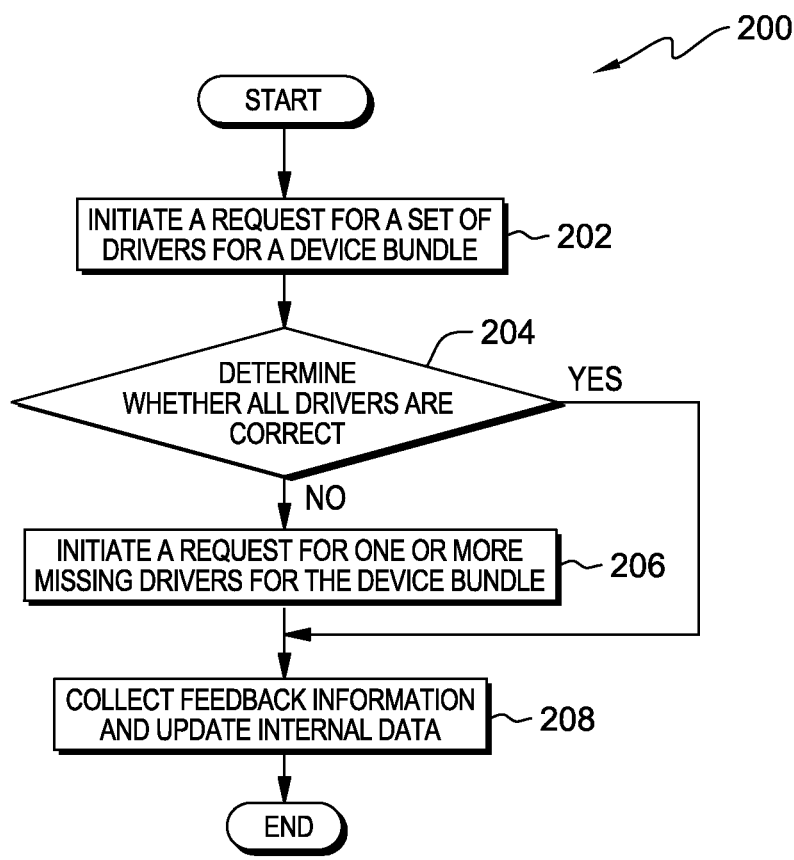
FIG. 2 depicts a flowchart of the operational steps of a client-side aggregate driver program for client-side management of device driver aggregation during operating system deployment, in accordance with an embodiment of the present invention.

FIG. 2 depicts a flowchart of the operational steps of client-side aggregate driver program 120(*a*), generally designated 200, for client-side management of device driver aggregation during operating system deployment, in accordance with an embodiment of the present invention. Flowchart 200 illustrates interactions between server 104 and client device 106 during OS deployment from the perspective of client-side aggregate driver program 120(a).

Client-side aggregate driver program 120(a) initiates a request for a set of drivers for a device bundle on a target client (202). In the exemplary embodiment, client-side aggregate driver program 120(a) initiates a request for a set of drivers for a device bundle by generating an aggregate device unique identifier (ADUI) for the device bundle, and sending the ADUI, a machine model, and a time stamp in the request to aggregate driver program 112. In the exemplary embodiment, generating the ADUI for the device bundle includes generating a hashed key of all PCI identifiers associated with the device bundle, such that the ADUI represents a unique set of PCI devices existing on the target client. In the exemplary embodiment, client-side aggregate driver program 120(a) sends the request to aggregate driver program 112 on server 104, which determines a best available driver bundle for the device bundle. In other embodiments, aggregate driver program 112 may determine and send individual drivers or create an associated driver bundle for the request.

In response to receiving a driver bundle, client-side aggregate driver program 120(a) determines whether all drivers are correct (204). In the exemplary embodiment, client-side aggregate driver program 120(a) determines whether all drivers are correct by unpacking and installing each of the drivers from the driver bundle, and confirming that each of the devices for which drivers were requested are supported and functional. Client-side aggregate driver program 120(a) processes each bundle installation result and information related to driver bundle quality is captured. For example, if one of the drivers in a driver bundle does not install, or does not fully support the device it was selected for, client-side aggregate driver program 120(a) captures this information for later use in driver bundle optimization.

In response to determining that at least one of the drivers in the best available driver bundle are not correct (NO branch, 204), client-side aggregate driver program 120(a) initiates a request for one or more missing drivers for the device bundle (206). In the exemplary embodiment, client-side aggregate driver program 120(a) initiates a request for one or more missing drivers for the requested device bundle by sending an outcome to aggregate driver program 112 including feedback information related to drivers that are correct (e.g., status of the driver, size of the driver relative to the driver bundle, and quality of driver, etc.) along with a request for an aggregate driver bundle for the incorrect drivers (i.e., missing drivers or non-functioning drivers). In response to determining that all drivers are correct (i.e., each of the devices in the device bundle are provided with working drivers) (YES branch, 204), client-side aggregate driver program 120(a) collects feedback information and updates internal data (208). In one embodiment, client-side aggregate driver program 120(a) collects feedback information on client device 106 and sends the feedback information to aggregate driver program 112 on server 104 to update internal data.

Figure 3:
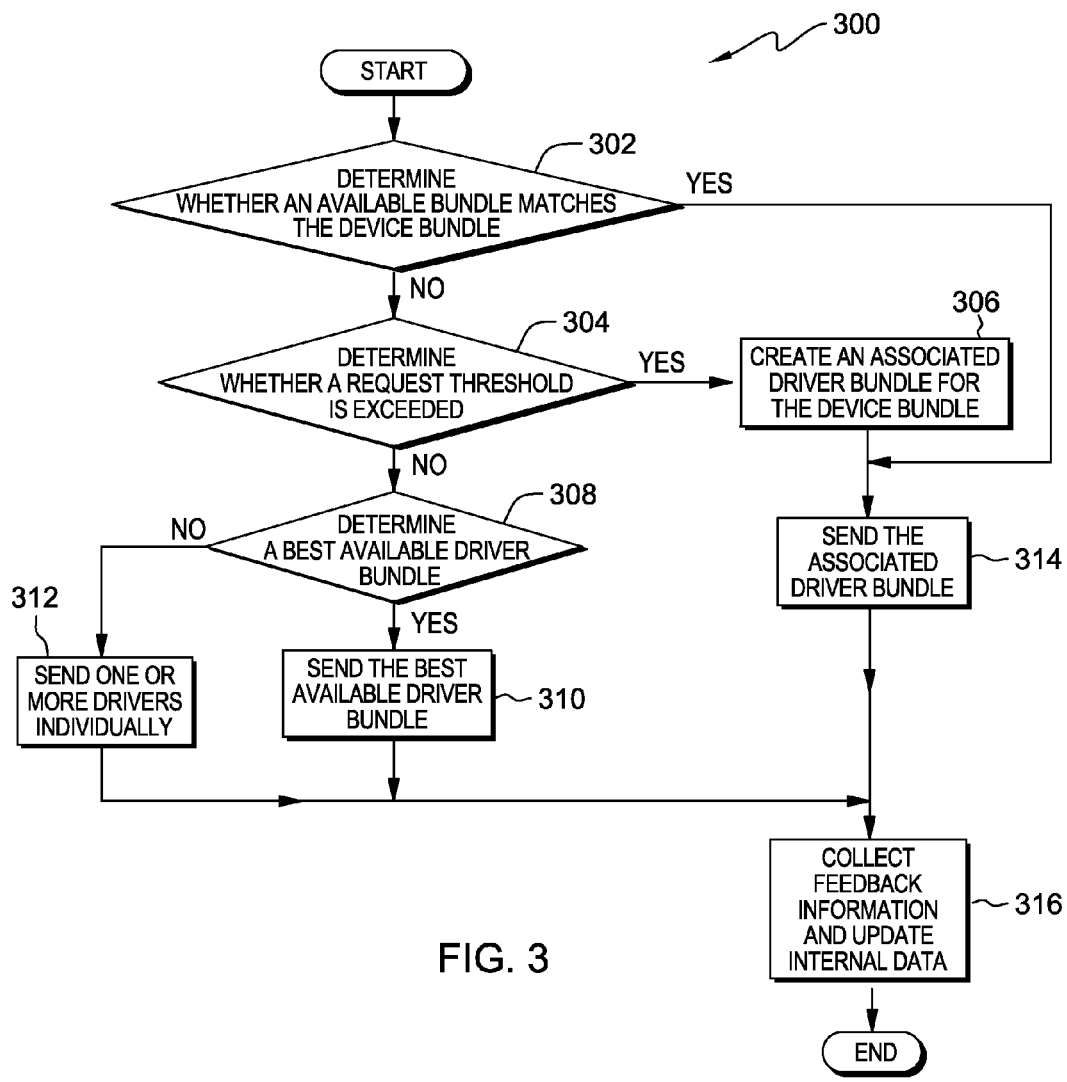
FIG. 3 depicts a flowchart of the operational steps of an aggregate driver program for server-side management of device driver aggregation during operating system deployment, in accordance with an embodiment of the present invention.

FIG. 3 depicts a flowchart of the operational steps of aggregate driver program 112, generally designated 300, for server-side management of device driver aggregation during operating system deployment, in accordance with an embodiment of the present invention. Flowchart 300 illustrates interactions between server 104 and client device 106 during OS deployment from the perspective of aggregate driver program 112.

In response to receiving a request for a set of drivers for a device bundle on a target client, for example, a request from client-side aggregate driver program 120(a) on client device 106, aggregate driver program 112 determines whether an available bundle matches the device bundle (302). In the exemplary embodiment, aggregate driver program 112 determines whether an available (driver) bundle matches the device bundle by processing the request, wherein processing the request includes registering the request and determining whether an associated driver bundle exists for the requested ADUI. In the exemplary embodiment, aggregate driver program 112 utilizes bundle selector 118 to register the request by incrementing a counter tracking a request threshold, tracking a time sequence of new request arrival (i.e., time stamps), and storing the request with its associated information in a history log within server 104. In the exemplary embodiment, aggregate driver program 112 utilizes bundle selector 118 to determine whether an available driver bundle exists for the requested ADUI by cross referencing the ADUI with the available driver bundles, and where an available driver bundle is associated with the device bundle represented by the ADUI, determining that the associated driver bundle matches the requested ADUI.

In another embodiment, client-side aggregate driver program 120(a) may be equipped with a driver provider proxy functionality to decrease server workload. In this embodiment, client-side aggregate driver program 120(a) enables a target client (either a target client being provisioned drivers, or one already provisioned drivers) to participate in ADUI requests (i.e., listen to requests for driver bundles for specific device bundles), and provide relevant driver bundles available locally on the target client (i.e., used in current OS deployment or locally stored after installation). For example, a second target client, such as client device 108, can request the same driver bundle used by a first target client, such as client device 106, and client device 106, utilizing the driver provider proxy functionality, provide the driver bundle to client device 108.

In response to determining an available driver bundle matches the device bundle represented by the ADUI (YES branch, 302), aggregate driver program 112 sends the associated driver bundle to client-side aggregate driver program 120(a) on client device 106 (314).

In response to determining an available driver bundle does not match the device bundle represented by the ADUI (NO branch, 302), aggregate driver program 112 determines whether a request threshold is exceeded (304). In the exemplary embodiment, aggregate driver program 112 utilizes bundle selector 118 to determine whether a request threshold is exceeded by referencing the counter tracking the request threshold, and where a predetermined number of the same ADUI request have been received, determining that the request threshold for that ADUI request is exceeded. For example, where a predetermined request threshold is set at 5 requests, upon receiving a sixth request, aggregate driver program 112 determines the request threshold is exceeded.

In response to determining that the request threshold for a particular ADUI request is exceeded (YES branch, 304), aggregate driver program 112 creates an associated driver bundle for the device bundle represented by the ADUI (306). In the exemplary embodiment, aggregate drive program 112 utilizes bundle selector 118 to create an associated driver bundle for the device bundle represented by the ADUI by referencing a PCI-ID list within the ADUI, wherein the PCI-ID list includes a device inventory and a plurality of device statistics, and aggregating drivers, such as drivers 116, relevant to each of the devices in the device bundle. In one embodiment, bundle selector 118 can reference additional heuristics, including, without limitation, past human experience (i.e., reusing data from other running environments), bundle size, bandwidth, driver quality (i.e., driver quality feedback), computation resources and time, and most requested drivers, etc., to tailor the driver bundle to best support each of the devices in the device bundle.

In response to creating an associated driver bundle for the device bundle represented by the ADUI, aggregate driver program 112 sends the associated driver bundle to client-side aggregate driver program 120(a) on client device 106 (314).

In response to determining that the request threshold for a particular ADUI request is not exceeded (NO branch, 304), aggregate driver program 112 determines a best available driver bundle (308). In the exemplary embodiment, aggregate driver program 112 utilizes bundle selector 118 to determine a best available driver bundle, wherein the best available driver bundle is an available (i.e., existing) driver bundle that is not an exact match (i.e., not associated) to the requested device bundle, but an available driver bundle that covers more than a percentage, for example, forty percent (configurable), of the requested driver bundle (i.e., ADUI request). Bundle selector 118 determines the best available driver bundle for the ADUI request by utilizing a plurality of heuristics, such as the most requested bundle for the same target client (i.e., similar target model, similar operating system, or similar target PCI inventory), to select a best matching available driver bundle associated with a similar ADUI. For example, if a target client initiates a request for a set of drivers for a device bundle including device 1, 2, 5, and 6, and currently no available device bundles are associated with device bundle 1, 2, 5, and 6 (i.e., no ADUI representing a PCI inventory of devices 1, 2, 5, and 6 is associated with an available driver bundle), bundle selector 118 may determine the best available driver bundle to be a driver bundle associated with an ADUI representing a PCI inventory of devices 1, 2, 3, and 4, as the driver bundle provides drivers for devices 1 and 2.

In response to determining a best available driver bundle (YES branch, 308) aggregate driver program 112 sends the best available driver bundle to client-side aggregate driver program 120(a) on client device 106 (310). In response to determining no best available driver bundle exists (NO branch, 308), aggregate driver program 112 sends one or more drivers individually (312). In the exemplary embodiment, there exists a case where it is not possible to determine the best available driver bundle. For example, in the case where none of the driver bundle requests (i.e., ADUI requests) have reached the request threshold, no best available driver bundle exists as bundle selector 118 has not yet created an associated driver bundle (i.e., if no request threshold has been exceeded, bundle selector 118 has not created an associated driver bundle).

In one embodiment, aggregate driver program 112 may receive, after sending a best available driver bundle, a request for one or more missing drivers. In response to receiving the request for one or more missing drivers for the device bundle, aggregate driver program 112 sends one or more drivers individually to client-side aggregate driver program 120(a) (not shown). In the exemplary embodiment, aggregate driver program 112 sends one or more drivers individually until client-side aggregate driver program 120(a) confirms that all drivers are correct. In another embodiment, aggregate driver program 112 may determine whether an available driver bundle matches the device bundle being request (i.e., a smaller subset of the original device bundle being requested), and proceed through the process flow again, this time working on a smaller subset of devices. In yet another embodiment, aggregate driver program 112 may determine an amount of missing drivers justifies a reiteration of the process by regenerating an ADUI request as a subset of the original (complete) ADUI request, including only missing drivers.

Aggregate driver program 112 collects feedback information and updates internal data (316). In the exemplary embodiment, aggregate driver program 112 collects feedback information and updates internal data periodically to facilitate more relevant driver bundles, optimize driver bundle size (i.e., smaller bundles shared across the systems), and improve network bandwidth and utilization of computation resources and time. For example, aggregate driver program 112 collects feedback information and updates internal data every time drivers are sent, received, and installed. In the exemplary embodiment, aggregate driver program 112 can collect feedback information directly from client-side aggregate driver program 120(a), such as is the case when driver consumer initiates requests for a set of drivers. In another embodiment, client-side aggregate driver program 120(a) sends feedback information collected on client device 106 to aggregate driver program 112 for updating internal data on server 104.

Figure 4:
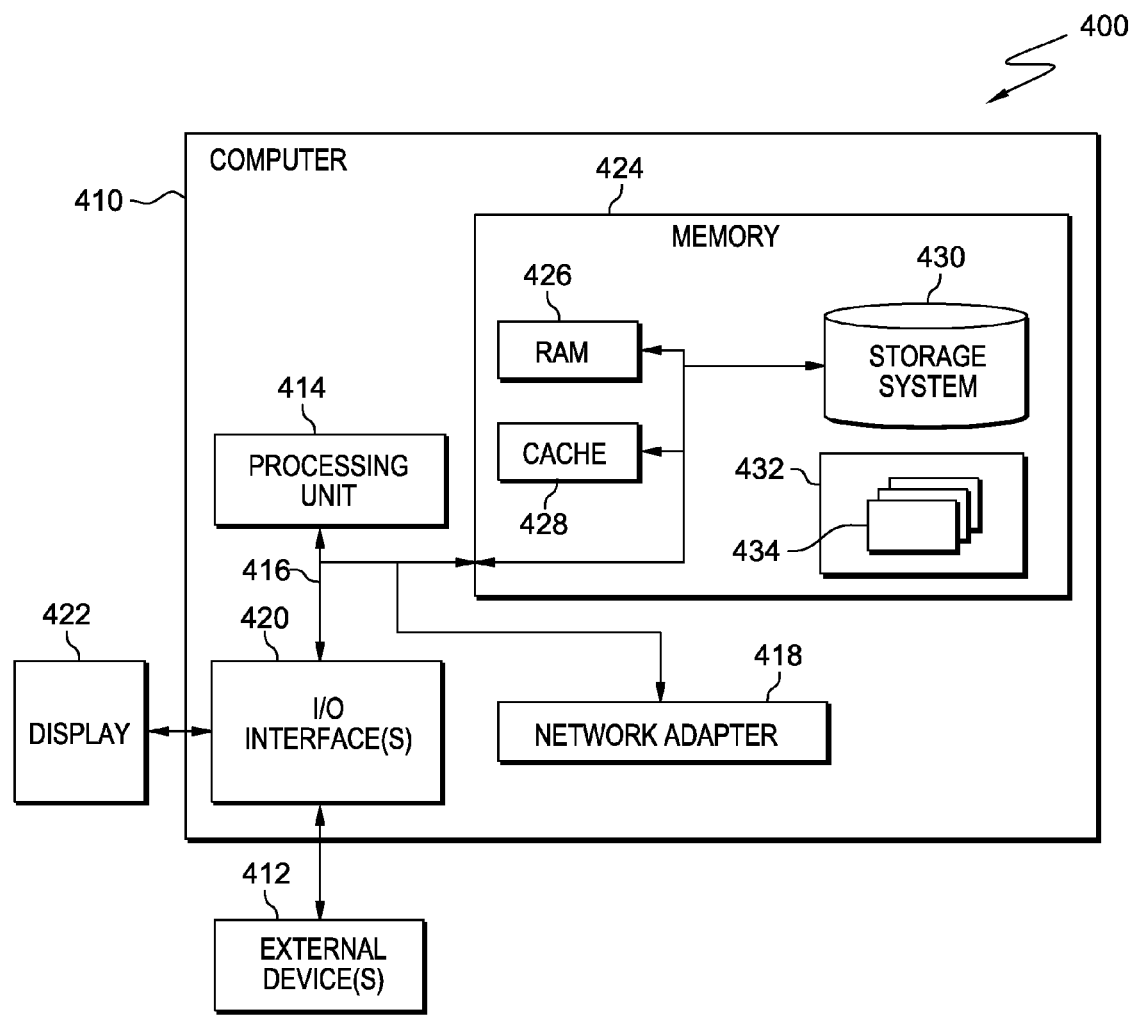
FIG. 4 illustrates a block diagram depicting components of a data processing system (such as the server computer of FIG. 1), in accordance with an embodiment of the present invention.

FIG. 4 depicts a block diagram of components of a data processing system, generally designated 400, in data processing environment 100, such as server 104 or client device 106, 108, or 110, in accordance with an illustrative embodiment of the present invention. It should be appreciated that FIG. 4 provides only an illustration of one implementation and does not imply any limitations with regard to the environments in that different embodiments may be implemented. Many modifications to the depicted environment may be made.

In the illustrative embodiment, data processing system 400 in data processing environment 100 is shown in the form of a general-purpose computing device. The components of computer 410 may include, but are not limited to, one or more processors or processing unit 414, memory 424, and bus 416 that couples various system components including memory 424 to processing unit 414.

Bus 416 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer 410 typically includes a variety of computer system readable media. Such media may be any available media that is accessible by computer 410, and it includes both volatile and non-volatile media, removable and non-removable media.

Memory 424 can include computer system readable media in the form of volatile memory, such as random access memory (RAM) 426 and/or cache memory 428. Computer 410 may further include other removable/non-removable, volatile/non-volatile computer system storage media. By way of example only, storage system 430 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM, or other optical media can be provided. In such instances, each can be connected to bus 416 by one or more data media interfaces. As will be further depicted and described below, memory 424 may include at least one computer program product having a set (e.g., at least one) of program modules that are configured to carry out the functions of embodiments of the invention.

Program/utility 432, having one or more sets of program modules 434, may be stored in memory 424 by way of example, and not limitation, as well as an operating system, one or more application programs, other program modules, and program data. Each of the operating systems, one or more application programs, other program modules, and program data, or some combination thereof, may include an implementation of a networking environment. Program modules 434 generally carry out the functions and/or methodologies of embodiments of the invention as described herein. Computer 410 may also communicate with one or more external device(s) 412 such as a keyboard, a pointing device, a display 422, etc., or one or more devices that enable a user to interact with computer 410 and any devices (e.g., network card, modem, etc.) that enable computer 410 to communicate with one or more other computing devices. Such communication can occur via Input/Output (I/O) interface(s) 420. Still yet, computer 410 can communicate with one or more networks such as a local area network (LAN), a general wide area network (WAN), and/or a public network (e.g., the Internet) via network adapter 418. As depicted, network adapter 418 communicates with the other components of computer 410 via bus 416. It should be understood that although not shown, other hardware and software components, such as microcode, device drivers, redundant processing units, external disk drive arrays, RAID systems, tape drives, and data archival storage systems may be used in conjunction with computer 410.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, a special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function (s). In some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

The terminology used herein is for the purpose of describing particular embodiments only and is not intended to be limiting of the invention. It should be appreciated that any particular nomenclature herein is used merely for convenience and thus, the invention should not be limited to use solely in any specific function identified and/or implied by such nomenclature. Furthermore, as used herein, the singular forms of "a", "an", and "the" are intended to include the plural forms as well, unless the context clearly indicates otherwise.

What is claimed is:

1. A method for managing device driver aggregation during operating system deployment, the method comprising:
    receiving, by a first computer processor, a request for a device bundle, the request including a unique identifier;
    determining, by the first computer processor, whether an available driver bundle matches the device bundle based, at least in part, on the unique identifier;
    responsive to determining the available driver bundle does not match the device bundle, creating, by the first computer processor, an associated driver bundle for the device bundle.

2. The method of claim 1, wherein the unique identifier represents a plurality of device identifiers associated with the device bundle.

3. The method of claim 1, wherein creating an associated driver bundle for the device bundle further comprises determining, by the first computer processor, whether a request threshold is exceeded by referencing a counter tracking the request threshold, and;
    where a predetermined number of a specific request for a device bundle have been received, determining that the request threshold for the specific request is exceeded; and
    where a predetermined number of a specific request for a device bundle has not been received, determining that the request threshold for the specific request is not exceeded.

4. The method of claim 3, further comprising responsive to determining that the request threshold for the specific request is exceeded, determining, by the first computer processor, a best available driver bundle for the device bundle by utilizing a plurality of heuristics to select the best available driver bundle from one or more associated driver bundles that cover more than a percentage of a requested device bundle.

5. The method of claim 4, further comprising sending, by the first computer processor, the best available driver bundle to a target client.

6. The method of claim 3, further comprising:
    creating, by one or more computer processors, the associated driver bundle for the device bundle by referencing a peripheral component interconnect identification (PCI-ID) list, wherein the PCI-ID list includes a device inventory and a plurality of device statistics;
    aggregating, by one or more computer processors, at least one driver relevant to each of a plurality of devices in the device bundle;
    sending, by one or more computer processors, the associated driver bundle to the target client; and
    storing, by one or more computer processors, the associated driver bundle under an aggregate device unique identifier, wherein the aggregate device unique identifier links the associated driver bundle to the device bundle.

7. The method of claim 1 further comprises determining, by a second computer processor, whether each driver in the associated driver bundle is correct for the device bundle, wherein determining whether each driver is correct includes confirming, by the second computer processor, that each of the plurality of devices within the device bundle for which drivers were requested are supported and functional, wherein confirming each of the devices are supported and functional includes:
    installing each driver from the associated driver bundle;
    processing each driver bundle installation result; and
    capturing information related to driver bundle quality.

8. The method of claim 7, responsive to determining that at least one of the drivers are not correct, further comprises initiating, by the second computer processor, a request for one or more missing drivers for the device bundle, wherein initiating the request for one or more missing drivers includes sending, by the second computer processor, an outcome result including feedback information related to each driver that is correct along with a request for an associated driver bundle for the one or more missing drivers.

* * * * *